Feb. 5, 1952 L. S. WILLIAMS 2,584,957
ELECTRICAL POSITIONING MECHANISM
Filed May 14, 1948 2 SHEETS—SHEET 1
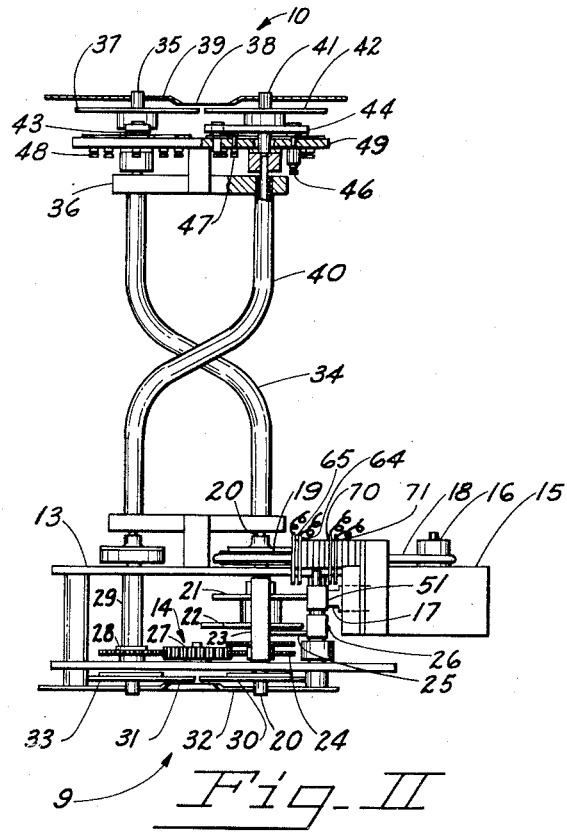
Fig. II
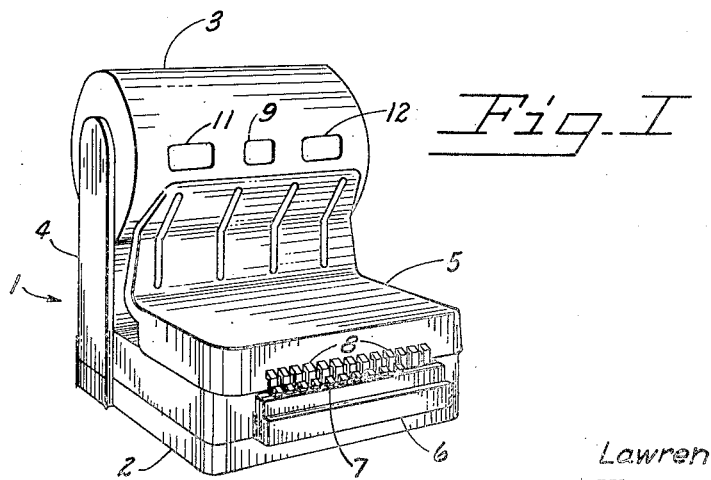
Fig. I
INVENTOR.
Lawrence S. Williams
BY
Marshall, Marshall & Leonard
ATTORNEYS Feb. 5, 1952
L. S. WILLIAMS
2,584,957
ELECTRICAL POSITIONING MECHANISM
Filed May 14, 1948
2 SHEETS—SHEET 2
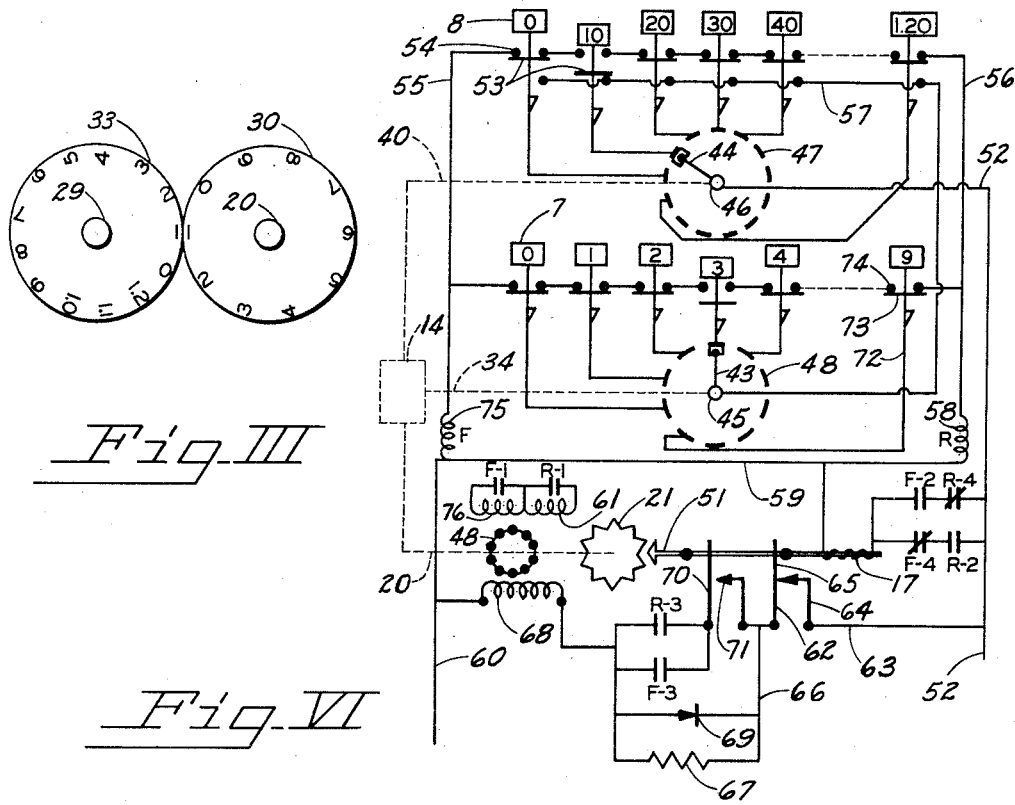
Fig. III
Fig. VI
Fig. IV
Fig. V
INVENTOR.
Lawrence S. Williams
BY
Marshall, Marshall & Leonard
ATTORNEYS Patented Feb. 5, 1952

2,584,957

UNITED STATES PATENT OFFICE 2,584,957

ELECTRICAL POSITIONING MECHANISM

Lawrence S. Williams, Toledo, Ohio, assignor to Toledo Scale Company, Toledo, Ohio, a corporation of New Jersey Application May 14, 1948, Serial No. 27,124

4 Claims. (Cl. 177—337)

This invention relates to mechanism for positioning a shaft and indicating mechanism according to positions selected by a remotely located keyboard. The new apparatus is particularly well adapted for use in computing weighing scales in which it is necessary to set up price indications one of which is visible to the merchant and the other of which is visible to the customer. For the merchant's convenience it is desirable that the keyboard, by means of which the price is selected, be located on his side of the scale. The positioning device serves to set up an indication according to the selected keys and may be employed to position other portions of the computing mechanism.

The object of the invention is to provide a simple mechanism that simultaneously displays indicia on each side of an indicator housing.

A further object of the invention is to provide mechanism for displaying more than a hundred values of the quantity being indicated by means of a pair of dials arranged in substantially coplanar relationship and interconnected by gearing having a ratio greater than 10 to 1.

A still further object of the invention is to provide an arrangement of mechanism such that all parts are easily accessible for inspection or maintenance without extensive disassembly.

More specific objects and advantages are apparent from the following description in which reference is made to the accompanying drawings.

According to the invention, a reversible electric motor is employed to drive an output shaft to a position determined by the operated keys of a keyboard and the final position of the shaft is indicated on both sides of the housing by high speed indicia bearing members one on each end of the shaft and each carrying indicia corresponding to the units value in the quantity to be indicated. A second shaft assembly is operatively connected through a gear reduction unit to the output shaft and its end portions are arranged in parallel relation to the ends of the first shaft and are similarly oriented with respect to the first shaft. Thus, when viewed from either side of the indicator housing, the end portions of the second shaft assembly are disposed to the left of the ends of the output shaft and each of such ends is provided with a disk carrying indicia representing tens and hundreds values of the quantity to be indicated.

The invention also includes an improved circuit for controlling the motor, which circuit includes selector switches mounted on the shafts and relays that are energized according to the lack of agreement between the position of the selector switches and the operated ones of the keys of the keyboard.

A preferred embodiment of the invention is illustrated in the accompanying drawings.

In the drawings:

Figure I is a perspective view of a computing weighing scale in which the improved mechanism may be used to adjust computing mechanism according to a price selected on a keyboard on the merchant's side of the scale.

Figure II is a plan view showing the general arrangement of the driving motor and the shaft assemblies that carry the indicia bearing disks.

Figure III is an elevation showing two indicia bearing disks in cooperative relation.

Figure IV is a fragmentary elevation of the indicating mechanism as seen from one side of the weighing scale.

Figure V is a fragmentary elevation, with parts broken away, showing the indicating mechanism as seen from the opposite side of the scale.

Figure VI is a schematic wiring diagram showing the circuits employed to control the motor according to the operation of keys in the selecting keyboard.

These specific figures and the accompanying description are intended merely to illustrate the invention but not to impose limitations on the claims.

A computing weighing scale in which the improved mechanism may be advantageously employed is contained within a housing 1 having a base portion 2 and a cylindrical indicator housing 3 that surmounts a tower portion 4 erected from the base 2. A load receiver 5 located over the base portion 2 is supported by lever mechanism included within the base 2 and the forces from loads applied to the load receiver 5 are counterbalanced and indicated by mechanism contained within the tower portion 4 and the cylindrical housing 3. The load counterbalancing mechanism is not part of the instant invention.

A keyboard mechanism 6 having a bank of units keys 7 and a bank of tens keys 8 is mounted on the front surface of the base 2 immediately below the skirt of the load receiver 5. The keys 7 and 8 through a control circuit and a motor set up a price indication that is displayed behind a window 9 on the merchant's side of the indicator housing 3 and through a similar window 10 (Figure II) on the customer's side of the scale. Other windows 11 and 12 on the merchant's side and corresponding windows on the other side of the indicator housing 3 are provided for weight and computed amount indications.

Referring now to Figure II, which is a plan view of the central portion of the interior of the indicator housing 3, a frame-work 13 supports a gear reduction assembly 14 and a motor 15 having an armature shaft carrying a pulley 16. The motor 15 is mounted immediately beneath a solenoid 17. The motor pulley 16 is connected through a belt 18 to a pulley 19 that is mounted on a first shaft 20 extending through and journaled in the frame 13. A star wheel 21, a cam 22, and the first gear of a gear train are rigidly mounted on the shaft 20. A U-shaped frame 23 of which only the top is shown in Figure II is rockably mounted on the shaft 20 and carries a portion of the gear train which includes as its output member a gear 24 loosely journaled on the shaft 20. In this embodiment the gear train has a reduction ratio of 13 to 1, i. e., the loosely journaled gear 24 turns at one-thirteenth the speed of the shaft 20. The rockable frame 23 is connected through a link 25 to a vertical rockable lever 26 which is oscillated by the cam 22 as the latter rotates with the shaft 20. The rocking motion transmitted from the cam 22 through the rockable lever 26 to the U-shaped frame 23 serves to oscillate a portion of the gear train in a manner such that the loosely journaled gear 24 remains stationary in space during nine-tenths of a revolution of the shaft 20 and then is moved quickly through one step during the remaining one-tenth of a revolution. The combination of the drive through the gear train and the oscillation of the frame 23 produces a montion similar to that of the driven wheels of a counter.

The loosely journaled gear 24 drives through an idler gear 27 to a gear 28 fixedly mounted on a shaft assembly portion 29, which portion is also journaled in the frame 13 and when viewed from the merchant's side of the scale is disposed to the left of the first shaft 20. An indicia bearing disk 30 is mounted near the end of the first shaft 20 so that indicia printed on its surface near its periphery are successively visible through an opening 31 of a bezel 32 which is mounted behind the window 9. Similarly, the shaft 29 carries an indicia bearing disk 33 the indicia of which are successively visible through the opening 31.

The shaft 20 is shown connected through a flexible shaft 34 so as to drive a shaft 35 which is journaled in a bracket 36 on the customer's side of the indicator housing 3. The shaft 35, which may be considered an extension of the shaft 20, carries an indicia bearing disk 37 the indicia of which are successively visible through an opening 38 in a bezel 39. The shaft assembly 29 includes a flexible portion 40 and a portion 41 that is journaled in the frame 36. The shaft portion 41 is fitted with a disk 42 carrying indicia representative of tens and hundreds values in the amount to be indicated, which indicia are successively visible through the opening 38 in position to register with the units indicia printed on the disk 37.

The flexible shafts or shaft portions 34 and 40 are representative of simple mechanism for driving the shaft portions 35 and 41 from the shafts 20 and 29 respectively and still keep the shaft portions or assemblies similarly oriented so that the low speed shaft always appears at the left of the high speed shaft. It is immaterial what gear or shaft arrangement is employed as long as the shaft ends are properly oriented.

The shafts 35 and 41 on the customer's side also carry wiper arms 43 and 44, which wiper arms cooperating with slip rings 45 and 46 respectively, and series of contacts 47 and 48 respectively constitute selector switches that are driven by the motor and which selector switches set up circuits according to the position of the shafts 20 and 29. The slip rings 45 and 46 and the contacts 47 and 48 are mounted in a non-conducting panel 49 that is in turn mounted from the bracket 36.

This arrangement of elements is particularly advantageous because the gear reduction unit and its associated parts are easily accessible from one side of the indicator housing while the selector switches are readily accessible from the other side of the indicator housing.

Referring now to Figure III, which shows the indicia bearing disks 30 and 33 that are located on the merchant's side of the indicator housing, it may be seen that the disk 30 has indicia running from zero to nine inclusive arranged in counter-clockwise direction on the disk so that clockwise rotation will successively present the indicia in ascending order. The indicia on the disk 30 representing units in the figure to be presented are arranged to be upright when they are located to the left of the center of rotation of the disk. Also, the disk 33 carrying the tens and hundreds indicia has the indicia arranged in ascending order in a counterclockwise direction so that clockwise rotation successively presents the indicia in ascending order. The latter indicia are arranged to be upright when they are located to the right of the center of the disk. Since the disks are arranged on parallel shafts and are substantially coplanar with their peripheries nearly touching each other, it is apparent that the indicia on the two disks as presented at the window may be read as a single number. Furthermore, by employing a speed ratio between the shafts which is greater than 10 to 1 and by extending the indicia on the disk 33 beyond 10, it is possible to indicate more than 100 individual values without employing more than two indicia bearing members.

The indicia on the disks 37 and 42 are arranged in reverse order inasmuch as the apparent rotation of the shafts when viewed from the other end is opposite to that of the disks 30 and 33. Thus, the fragment of the disk 37 that is visible in Figure V indicates that the indicia are arranged in ascending order in a clockwise direction and are successively presented in ascending order by counterclockwise rotation of the disk.

Figure IV shows the appearance of the indicia as they are visible through the opening 31 in the bezel 32 and also indicates the position of the U-shaped frame 23 carrying a portion of the gear train and the link 25 that connects it to the rockable lever 26. The cam 22 and a roller 50 mounted in the rockable lever 26 are also indicated.

Figure V shows the indication including a portion of the bezel 39 as it is seen from the customer's side of the indicator housing 3. This figure also shows in more detail the wiper arm 43 and its cooperation with the contacts 48 and slip ring 45.

The structure so far described provides a simple easily constructed mechanism for indicating to two observers on opposite sides of the device the position of a shaft that is driven to a position corresponding to a selection set up on a keyboard. The electrical circuits for controlling the motor are shown in Figure VI. In this figure the wipers 43 and 44 of the selector switches are shown in the position to which they are driven by the motor and which position corresponds to the operated ones of the keys 7 and 8. A detent mechanism 51 that is controlled by the solenoid 17 is shown midway in its travel as it approaches the star wheel 21 to accurately index the star wheel in the selected position.

In the circuit power from an alternating current source of supply flows through a lead 52 to the slip ring 46 and thence through the wiper arm 44 to one of the contacts 47. The selector switch contacts 47 are connected one to each of movable contact portions 53 of contacts 54 which are controlled by the tens keys 8 of the keyboard. As long as none of the keys are depressed all of the selector switch contacts are connected together through the contacts 54 and are also connected at the ends of the series of contacts to leads 55 and 56. When one of the tens keys 8 is depressed it breaks the circuit through the contacts 54 at each of two points and connects the associated selector switch contact 53 to a third lead 57 the other end of which is connected to the selector switch of another or non-corresponding series of key-operated contacts.

Assume for the moment that the selector switch 47 is positioned for an amount greater than the selected one of the keys 8. Under this condition current from the lead 52 flows through the wiper arm 44 to the contact 47 then contacted by the wiper arm 44 and through the connecting lead to the associated contact portion 53 and through the series of contacts 54 to the lead 56. The lead 56 is connected to an operating coil 58 of a reverse relay R. The other side of the relay coil 58 is connected through a lead 59 to a return lead 60 connected to the source of power. Current flow through this path energizes the relay R so that it closes its contacts R1, R2 and R3 at the same time that it opens its normally closed contact R4. The contact R1 closes a shading coil 61 of the motor. The contact R2, in closing, completes a circuit from the supply lead 52 through a normally closed contact F4 and the operating coil or the solenoid 17 to the return lead 59. Current flow through this path causes the solenoid 17 to withdraw the detent mechanism 51. The initial movement of the detent mechanism 51 closes a set of contacts 62 so that current may flow from the supply lead 52 through a lead 63, a stationary leaf 64 of the contact 62, a movable leaf 65, a lead 66, a resistor 67, and a field coil 68 of the motor. The other side of the field coil 68 is connected to the return lead 60. The resistor 67 is in parallel with a rectifier 69 so that the motor field is energized in part by rectified alternating current impulses having a substantial direct current component so that the motor operates at a slow speed.

When the solenoid 17 completely retracts the detent mechanism 51 the detent mechanism forces a spring contact 70 against a fixed contact 71 thereby establishing a shunt circuit around the rectifier 69 by way of the contacts 70 and 71 and the now closed contact R3. Shorting out the rectifier 69 provides normal excitation for the motor field 68 and the motor operates at full speed. The motor circuit that was completed by the operation of the relay R causes the motor to run in such a direction that the wiper arms 43 and 44 are rotated counterclockwise as shown in Figure VI.

When the wiper 44 reaches that one of the contacts 47 which is connected to the operated one of the keys 8, i. e., the key shown in depressed position, current can no longer flow from the wiper 44 to the lead 56 because of the open circuit at the contact 54. However, current may now flow from the depressed contact portion 53 through the lead 57 to the slip ring 45 of the high speed selector switch and through the wiper 43 to the contacts 48. When the wiper 44 (of the tens selector switch) reaches that one of the contacts 47 which is connected to the depressed one of the tens keys 8, the wiper 43 (of the units selector switch) has just come in contact with that one of the contacts 48 which is connected to the end key of the units bank of the keys 7. Current then flows from the lead 57 through the wiper 43 and the contact 48 to a lead 72 that is connected to a movable element 73 of a set of contacts 74 one of which is connected to the lead 56 so that current may continue to flow through the operating coil 58 of the R relay. Each of the other keys 7 is similarly connected to the contacts 48 (which as long as one of the keys is depressed form a circuit between the leads 55 and 56) so that the motor continues to run until it reaches that one of the contacts that is connected to the depressed key of the units bank. When the wiper arm 43 reaches this contact, the circuit to the relay coil 57 is opened and the relay then opens its contacts thereby opening the shading coil 61 and de-energizing the solenoid 17.

The opening of the relay contact R3 instantly places the rectifier 69 back into the circuit so that the motor field 68 is supplied with current having a substantial direct current component with a result that the motor acts as an eddy current brake to secure rapid deceleration and quick stopping before and during the time that the detent mechanism 51 is moving toward the star wheel 21. The deceleration produced by the direct current is sufficient to bring the motor and star wheel 21 substantially to rest before the detent mechanism 51 can engage the star wheel.

If the position of the wiper arms 43 and 44 corresponds to a number less than that selected on the keyboard 6 current flows through the wiper arms 44 or 43 and the contacts 47 or 48 to the lead 55. The lead 55 is connected to an operating coil 75 of an F relay, the other side of which coil is connected to the return lead 60. The F relay has a first set of normally open contacts F1 that serve to short a shading coil 76 of the motor, a second set of normally open contacts F2 that are connected in series with the normally closed contacts R4 for energizing the solenoid 17, and a third set of normally open contacts F3 in parallel with the contacts R3 of the R relay. The F relay operates the motor and solenoid 17 in substantially the same manner as the relay except that the direction of rotation is reversed.

This circuit arrangement is very effective for securing quick and accurate positioning of the indicating mechanism in that it responds instantly to any change in the selection set up by the keys 7 and 8 and that it accurately stops at the selected point with a minimum of overshoot. In the event that the wiper arm 43 and the motor travels too far the wiper arm contacts the next contact in the series of contacts 48 thereby energizing the motor in the reverse direction. Since the motor can not get up the speed before the wiper arm 43 is returned to the selected one of the contacts it follows that the system will not oscillate about the selected contact but will rather stop on the selected point either the first time it reaches that point or on the first return to the point. The action of the relays in placing the rectifier in series with the motor at the very instant that the relay operates and without waiting for the detent mechanism 51 to operate insures that the motor is stopped in a minimum length of time.

Various modifications may be made in the shaft assemblies and the reduction gearing as well as in the arrangement of the indicia on the disks to accommodate the improved positioning apparatus for specific uses without departing from the spirit and scope of the invention.

Having described the invention, I claim:

1. In a device of the class described, in combination, a reversible electric motor, a first shaft driven by said motor, a speed reducer driven by the motor, a second shaft arranged parallel to the first and driven by the speed reducer, at least one of said shafts having a flexible portion permitting said shafts to be transposed along their length so that when viewed from either end the shafts are similarly oriented, indicia bearing disks mounted on each end of each shaft, the disks at each end of the parallel end portions of the shafts being substantially coplanar, a selector switch mounted on each shaft, relays for controlling the motor, and a plurality of manually operable contacts in circuit relation with the relays and selector switches, said contacts, relays and selector switches serving to drive the motor until the indication of the indicia bearing disks corresponds to the operated ones of the manually operable contacts.

2. In a device of the class described, in combination, a reversible electric motor, a first shaft driven by the motor, a speed reducer, a second shaft driven by the motor through the speed reducer, at least one of said shafts having a flexible section, said shafts having their ends disposed in generally parallel and similarly oriented relation, an indicia bearing disk on each end of each shaft, the indicia bearing portions being substantially coplanar in the reading area, a selector switch mounted on each shaft, relays for controlling the motor, and a plurality of manually operable contacts in circuit with the selector switches, said contacts, relays, and selector switches cooperating to drive the motor until the indication of the indicia corresponds to the operated ones of the contacts.

3. In a device of the class described, in combination, a reversible electric motor, a first shaft assembly driven by the motor, a speed reducer having a reduction ratio greater than ten to one, a second shaft assembly driven by the motor through the speed reducer, an indicia carrying member mounted on each end of each of the shaft assemblies, the members carried on the slow speed shaft assembly each having a series of indicia extending beyond ten, said members on adjacent ends being coplanar and adjacent such that the indicia form a complete number, and a motor control comprising a selector switch carried on each shaft assembly, two banks of key-operated normally-closed series-connected contacts, the banks being connected in parallel, each contact being connected to a point of the corresponding selector switch, and circuit means energized through the selector switches and contacts for driving the motor to display indicia corresponding to the operated ones of the key-operated contacts.

4. In a device of the class described, in combination, a reversible electric motor, a first shaft driven by the motor, a speed reducer, a second shaft driven by the motor through the speed reducer, at least one of said shafts having a flexible section, said shafts having their ends disposed in generally parallel and similarly oriented relation, and an indicia bearing disk on each end of each shaft, the indicia bearing portions being substantially coplanar in the reading area.

LAWRENCE S. WILLIAMS.

REFERENCES CITED

The following references are of record in the file of this patent:

UNITED STATES PATENTS

| Number | Name | Date |
|---|---|---|
| 983,190 | Wisner | Jan. 31, 1911 |
| 1,223,169 | Henschel | Apr. 17, 1917 |
| 2,180,908 | Nevinger | Nov. 21, 1939 |
| 2,442,739 | Yardney | June 1, 1948 |

FOREIGN PATENTS

| Number | Country | Date |
|---|---|---|
| 14,415 | Great Britain | of 1908 |
| 75,440 | Austria | Feb. 10, 1918 |
| 488,096 | Great Britain | June 29, 1938 |